US012432021B2

(12) United States Patent
Nielsen et al.

(10) Patent No.: US 12,432,021 B2
(45) Date of Patent: Sep. 30, 2025

(54) IRREGULAR BANDWIDTH SUPPORT AT A USER EQUIPMENT

(71) Applicant: Nokia Technologies Oy, Espoo (FI)

(72) Inventors: Kim Nielsen, Storvorde (DK); Knud Knudsen, Aabybro (DK); Alessio Marcone, Munich (DE); Amol Dhere, Gistrup (DK); Stig Blücher Brink, Aalborg Øst (DK); Karsten Petersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 336 days.

(21) Appl. No.: 18/067,181

(22) Filed: Dec. 16, 2022

(65) Prior Publication Data
US 2023/0198695 A1    Jun. 22, 2023

(30) Foreign Application Priority Data

Dec. 22, 2021    (EP) .................................... 21217038

(51) Int. Cl.
*H04L 27/26*      (2006.01)
*H04L 5/00*      (2006.01)

(52) U.S. Cl.
CPC .......... *H04L 5/0041* (2013.01); *H04L 5/0044* (2013.01)

(58) Field of Classification Search
CPC ........... H04B 1/0475; H04B 2001/0491; H04J 13/0018; H04L 27/001; H04L 5/0041; H04L 5/0044
See application file for complete search history.

(56) References Cited

U.S. PATENT DOCUMENTS

2023/0118653 A1*   4/2023   Nielsen ................. H04L 5/0064
                                                        370/329
2023/0131663 A1*   4/2023   Sayenko ............... H04L 5/0044
                                                        370/329

FOREIGN PATENT DOCUMENTS

EP            3484213 B1      12/2020
WO     2017/123279 A1      7/2017
(Continued)

OTHER PUBLICATIONS

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.2.0, Jun. 2021, pp. 1-536.
(Continued)

*Primary Examiner* — Shukri Taha
(74) *Attorney, Agent, or Firm* — Nokia Technologies Oy

(57) ABSTRACT

An apparatus such as a user equipment configured to support an irregular bandwidth signal. The apparatus comprising multiple means for frequency translating a wireless communication signal in a frequency bandwidth that is different to a predefined bandwidth and for filtering said frequency translated wireless communication signals. Means for adjusting a centre frequency used by the multiple means for frequency translating; and control means. The control means being responsive to receipt of a signal indicating a wireless communication network is currently supporting an irregular channel bandwidth, said irregular channel bandwidth covering two partially overlapping regular channel bandwidths each having said predefined bandwidth, to route a received wireless communication signal to each of the multiple means for frequency translating and to control the means for adjusting to set a respective centre frequency of the multiple means for frequency translating such that said centre fre-
(Continued)

Figure 1:
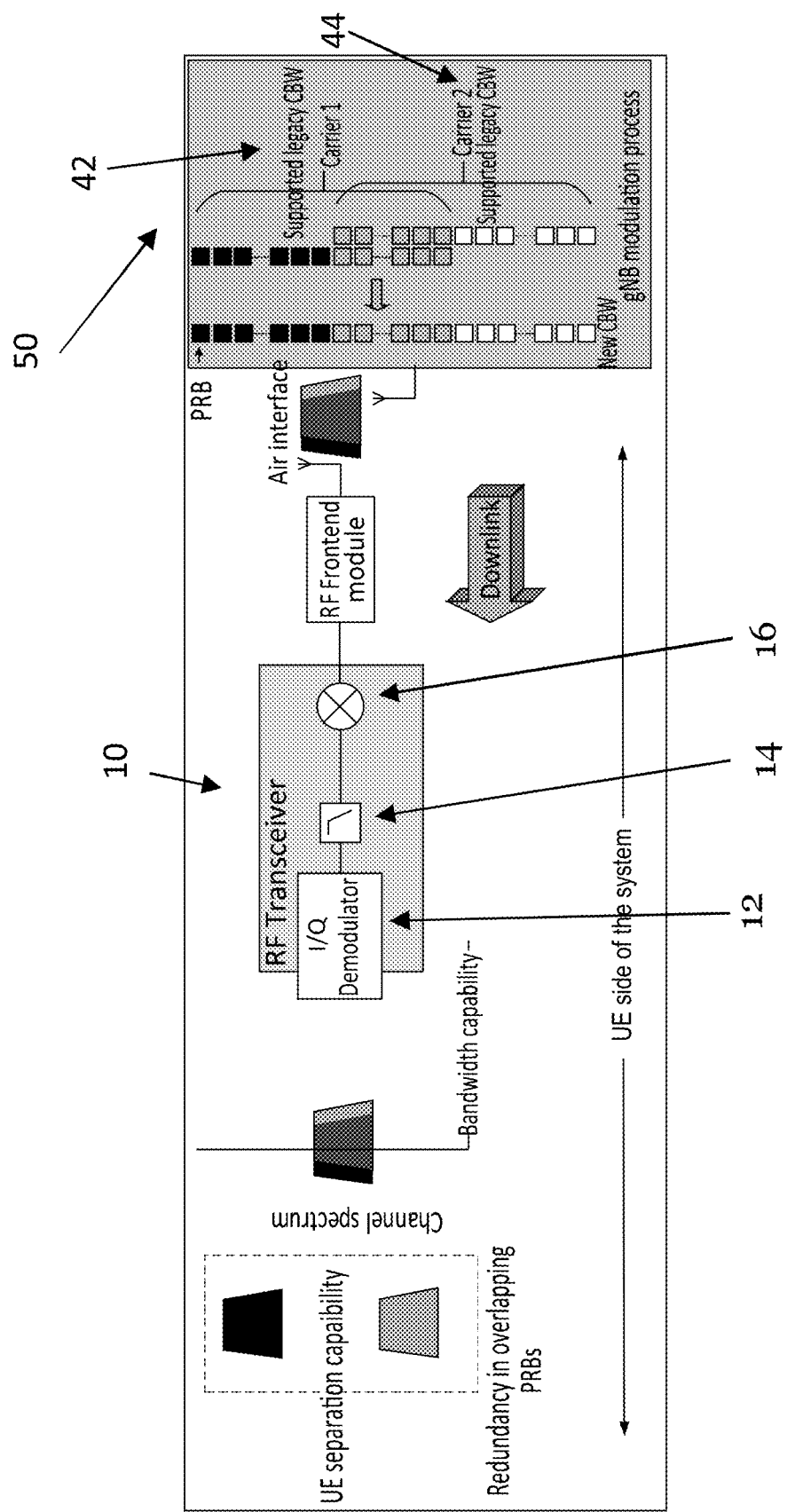

quency of each of the multiple means for frequency translating is offset with respect to each other.

16 Claims, 9 Drawing Sheets

(56) References Cited

FOREIGN PATENT DOCUMENTS

| | | |
|---|---|---|
| WO | 2018/222662 A1 | 12/2018 |
| WO | 2020/221711 A1 | 11/2020 |

OTHER PUBLICATIONS

European Application No. 21203202.3, "Channel Filtering in a User Equipment", filed on Oct. 18, 2021, pp. 1-18.
"3rd Generation Partnership Project; Technical Specification Group Radio Access Network; NR; Study on Efficient utilization of licensed spectrum that is not aligned with existing NR channel bandwidths (Release 17)", 3GPP TR 38.844, V0.0.4, Aug. 2021, pp. 1-18.
"Comparison of Alternate Methods for Irregular CBW", 3GPP RAN WG4 Meeting #99e, R4-2109245, Agenda: 10.2.3, Intel Inc, May 19-27, 2021, 9 pages.
"On the use of overlapping channel bandwidths from UE perspective", 3GPP TSG-RAN WG4 Meeting # 100-e, R4-2114367, Agenda: 10.2.3, Nokia, Aug. 16-27, 2021, 8 pages.
"TP on using next larger channel bandwidth solution", 3GPP TSG-RAN WG4 Meeting # 100-e, R4-2112365, Agenda: 10.2.2, Apple, Aug. 16-27, 2021, 3 pages.
Lu et al., "Antenna Preprocessing and Element-Pattern Shaping for Multi-Band mmWave Arrays: Multi-Port Receivers and Antennas", IEEE Journal of Solid-State Circuits, vol. 55, No. 6, Jun. 2020, pp. 1455-1470.
Extended European Search Report received for corresponding European Patent Application No. 21217038.5, dated Jun. 7, 2022, 13 pages.
"TP to TR 38.844: on the use of overlapping channel bandwidths from UE perspective", 3GPP TSG-RAN WG4 Meeting # 101-e, R4-2119230, Agenda: 9.2.3.2.2, Nokia, Nov. 1-12, 2021, 8 pages.
"TP to TR 38.844: on the use of overlapping channel bandwidths from UE perspective", 3GPP TSG-RAN WG4 Meeting # 101-e, R4-2120016, Agenda: 9.2.3.2.2, Nokia, Nov. 1-12, 2021, 11 pages.
Notice of Allowance received for corresponding European Patent Application No. 21217038.5, dated Jun. 26, 2025, 8 pages.

* cited by examiner

IRREGULAR BANDWIDTH SUPPORT AT A USER EQUIPMENT

RELATED APPLICATION

This application claims priority to the European Patent Application 21217038.5, filed on Dec. 22, 2021, the content of which is incorporated herein by reference in its entirety.

TECHNOLOGICAL FIELD

Various example embodiments relate to providing irregular bandwidth support at a user equipment.

BACKGROUND

Different ways of more efficiently utilising the licensed spectrum are currently under consideration and one of these involves increasing channel flexibility by providing channels that are not necessarily aligned with existing NR (new radio) channel bandwidths, so called irregular channel bandwidths.

There are different ways to implement this capability such as wider channel bandwidth BW, overlapping carrier aggregation CA, or overlapping channel BW from the network side.

Supporting irregular bandwidths at the UE may not be straightforward. User equipment may have channel filters configured to receive signals within predefined bandwidths. The filters are generally configured so that the bandwidths align to the bandwidths of new radio NR channels. Thus, although an irregular channel bandwidth may enable the wireless communication spectrum to be used more efficiently, the hardware such as the filters of user equipment may not be adapted to these irregular bandwidths.

BRIEF SUMMARY

The scope of protection sought for various embodiments of the disclosure is set out by the independent claims. The [embodiments/examples] and features, if any, described in this specification that do not fall under the scope of the independent claims are to be interpreted as examples useful for understanding various embodiments of the disclosure.

According to various, but not necessarily all, embodiments of the disclosure there is provided according to one aspect an apparatus, comprising: a first means for frequency translating a wireless communication signal in a frequency bandwidth that is different to a predefined bandwidth and for filtering said frequency translated wireless communication signal; a second means for frequency translating the wireless communication signal in a frequency bandwidth that is different to a predefined bandwidth and for filtering said frequency translated wireless communication signal; a first means for adjusting a centre frequency used by said first means for frequency translating; a second means for adjusting a centre frequency used by said second means for frequency translating; and means for controlling, said means for controlling being responsive to receipt of a signal indicating a wireless communication network is supporting an irregular channel bandwidth, said irregular channel bandwidth covering two partially frequency overlapping regular channel bandwidths each one of the regular channel bandwidths having said predefined bandwidth, to route a received wireless communication signal to said first and said second means for frequency translating and to control said first means for adjusting to set a centre frequency of said first means for frequency translating and to control said second means for adjusting to set a centre frequency of said second means for frequency translating such that said respective centre frequencies of said first and said second means for frequency translating are offset with respect to each other.

Example embodiments provide a way of supporting irregular channel bandwidths at an apparatus such as a user equipment in some cases by reusing the hardware that is already present on the apparatus and in other cases by making minor amendments to the hardware. User equipment typically have one or more channel filters each configured with a bandwidth corresponding to the bandwidth of one of the channels that the network supports. Where irregular bandwidths that do not correspond to the bandwidth of the channel filters are used, then receiving the signals becomes problematic. Where the irregular bandwidth signal corresponds to two overlapping regular channel bandwidths, then hardware on the apparatus can be configured to process these signals. This may be done by sending the received signal to two means for frequency translating and filtering the signal, these may each be configured to translate the signal to a bandwidth each with a different centre frequency, these two offset signals are then filtered, the filter may be a filter configured to pass a signal within a regular predefined bandwidth and to attenuate signals outside of the regular predefined bandwidth.

The filters may function as bandpass or lowpass filters within the predefined channel bandwidth. The width of the bandwidth that is passed by the filtering means for the channel may be predefined, but the effective centre frequency of this filtering means for the channel may be adjustable. The effective centre frequency of a means for filtering a channel depends on the centre frequency of the filter relative to the centre frequency of the channel that it is filtering. Thus, the means for adjusting may change the effective centre frequency of the translating means by changing the effective centre frequency of the filtering portion of the translating means or by adjusting the centre frequency of the channel of the received signals that are sent to the filtering means. In either case the at least two means for translating have an offset of the effective centre frequency.

In some embodiments, the respective centre frequencies of said first and second means for translating is offset by an amount that is less than said predefined bandwidth. In some embodiments, it is offset by an amount equal to the irregular bandwidth minus the regular bandwidth. In some embodiments, it is offset by the same amount that a centre frequency of the two partially overlapping regular channels are offset from each other.

In some embodiments, said means for frequency translating comprises a mixer and said means for adjusting a centre frequency comprises a means for adjusting a centre frequency of a local oscillator of the mixer.

In some embodiments, the apparatus further comprises a means for uniting said signals output by said at least frequency translating to form an irregular bandwidth signal.

In some embodiments, the means for uniting may be a means for combining and a means for concatenating or just a means for combining.

In some embodiments, the apparatus further comprises means for combining a plurality of signals; and means for concatenating a plurality of signals to form an irregular bandwidth signal; and means for routing frequency overlapping portions of said translated and filtered signals to said means for combining and means for routing frequency non-overlapping portions of said filtered signals and signals output from said means for combining to said means for concatenating.

In some embodiments, the apparatus comprises a means for channel equalisation for equalising the channels prior to the signals being concatenated.

In some embodiments, said first and second means for frequency translating are each configured to pass signals within a predefined bandwidth and attenuate signals outside of said predefined bandwidth, a respective centre frequency of said predefined bandwidth being set by a respective one of said first and second means for adjusting, said apparatus further comprising: means for extending a signal output by each of said two means for frequency translating to extend said predefined bandwidth to a bandwidth size of said irregular bandwidth by applying zeros to one side of said predefined bandwidth, said one side corresponding to a portion of said signal of said irregular bandwidth not passed by said filtering means; and means for combining said extended signals to form an irregular bandwidth signal.

In some embodiments, the bandwidth of the filtered signal may be extended to be the size of the irregular bandwidth by applying zeros to one side and in this case rather than having a means for combining and concatenating just one means for combining can be used to unite the two signals.

In some embodiments, said means for combining comprises a maximum ratio combining means.

In some embodiments, said means for extending comprises a data store configured to store a signal of irregular bandwidth, said data store being preloaded with zeros.

In some embodiments, said apparatus further comprises means for decoding said irregular bandwidth signal.

In some embodiments, said apparatus further comprises first and second antennas, said means for controlling routing signals from said fits antenna to said first means for frequency translating and from said second antenna to said second means for frequency translating.

In some embodiments, embodiments may make use of a diversity path and provide an offset between the two frequency translating means such that the diversity paths can be used for an irregular bandwidth.

In other embodiments, signals from a single antenna may be routed to the first and second means for frequency translating.

In some embodiments, said means for controlling is responsive to determining that said signal strength is below a predetermined value to continue with said diversity mode and to determining that said signal strength is not below the predetermined value, to route said received wireless communication signal from said first antenna to said first means for frequency translating and from said second antenna to said second means for frequency translating and to control said first and second means for adjusting to set a respective centre frequency of said first and second means for frequency translating such that said centre frequency of each of said first and second means for frequency translating are offset with respect to each other.

In some embodiments, said means for controlling is responsive to determining that said signal strength is below a predetermined value to continue with said diversity mode and to determining that said signal strength is not below the predetermined value, to route said received wireless communication signal from said first antenna to said first means for frequency translating and from said second antenna to said second means for frequency translating and to control said first and second means for adjusting to set a respective centre frequency of said first and second means for frequency translating such that said centre frequency of each of said first and second means for frequency translating are offset with respect to each other.

In some embodiments, said means for controlling is responsive to receipt of said signal indicating a wireless communication network is supporting an irregular channel bandwidth, to determine whether multiple input multiple output mode is operational and if not to route said received wireless communication to each of said first and second means for frequency translating and to control said first and second means for adjusting to set a respective centre frequency of said first and second means for frequency translating such that said respective centre frequencies of each of said first and second means for frequency translating are offset with respect to each other According to various but not necessarily all embodiments of the disclosure there is provided according to a further aspect a method, comprising: receiving a signal indicating a wireless communication network is supporting an irregular channel bandwidth, said irregular channel bandwidth covering two partially overlapping regular channel bandwidths each having a predefined bandwidth;

receiving a wireless communication signal in said irregular channel bandwidth;

routing said wireless communication signal to first and second means for frequency translating said wireless communication signal and for filtering said frequency translated wireless communication signals to generate a first and second frequency translated and filtered signals;

setting a respective centre frequency used by a respective one of said first and second means for frequency translating, such that said centre frequencies of said first and second means for frequency translating are offset with respect to each other.

In some embodiments, the method further comprises combining overlapping portions of said translated and filtered signals; concatenating non-overlapping portions of said translated and filtered signals and said combined overlapping portions to form an irregular bandwidth signal.

In some embodiments, said step of generating said first and second frequency translated and filtered signals at said first and second means for frequency translating said wireless communication signal comprises passing signals within a predefined bandwidth and attenuating signals outside of said predefined bandwidth, respective centre frequencies of said predefined bandwidths for each of said first and second frequency translated and filtered signals being offset with respect to each other: said method further comprising extending each of said first and second frequency translated and filtered signals to extend said predefined bandwidth to a bandwidth size of said irregular bandwidth by applying zeros to one side of said predefined bandwidth, said one side corresponding to a portion of said signal of said irregular bandwidth not passed by said filtering means; and combining said extended first and second frequency translated and filtered signals to form an irregular bandwidth signal.

In some embodiments, said method further comprises decoding said irregular bandwidth signals.

In some embodiments, the method further comprises receiving said wireless communication signal in said irregular channel bandwidth at first and second antennas; said step of routing said wireless communication signal comprising routing said wireless communication from each of said first and second antennas to a respective one of said first and second means for frequency translating.

In some embodiments, the method further comprises in response to receipt of said signal indicating a wireless communication network is currently supporting an irregular channel bandwidth and prior to performing said step of routing; determining whether at least two of said at least two antenna are being used to receive a same signal in a diversity mode, and if so, determining a current signal strength of said received same signal and where said signal strength is below a predetermined value continuing with said diversity mode and where not, performing said step of routing said received wireless communication signal from said two of at least two of said antenna to each of said at least two means for frequency translating.

In some embodiments, the method comprises in response to receipt of said signal indicating a wireless communication network is supporting an irregular channel bandwidth; determining whether said first and second antenna are being used to receive a signal in a diversity mode, and if so, determining a signal strength of said received signal and where said signal strength is below a predetermined value continuing with said diversity mode and where not, setting a respective centre frequency used by a respective one of said first and second means for frequency translating, such that said centre frequencies of said first and second means for frequency translating are offset with respect to each other.

In some embodiments, said means for frequency translating a wireless communication signal in a frequency bandwidth that is different to a predefined bandwidth and for filtering said frequency translated wireless communication signal comprises circuitry configured to frequency translate a wireless communication signal in a frequency bandwidth that is different to a predefined bandwidth and to filter said frequency translated wireless communication signal.

In some embodiments said means for adjusting a centre frequency comprises circuitry configured to adjust said centre frequency.

In some embodiments said means for controlling comprises circuitry configured to control.

In some embodiments, said means for combining a plurality of signals comprises circuitry configure to combine a plurality of signals and said means for concatenating a plurality of signals comprises circuitry configured to concatenate a plurality of signals.

In some embodiments, said means for routing comprises circuitry configured to route.

In some embodiments, said means for extending a signal comprises circuitry configured to extend a signal.

In some embodiments, said means for decoding said irregular bandwidth signal, comprises circuitry configured to decode said irregular bandwidth signal.

According to various but not necessarily all embodiments in the disclosure there is provided according to a yet further aspect a computer program which when executed by a processor on a user equipment is operable to control said user equipment to perform a method according to a further aspect.

In some embodiments, the means comprises at least one processor and at least one memory including computer program code, the at least one memory and computer program code being configured to, with the at least one processor, cause performance of the apparatus.

According to various but not necessarily all embodiments in the disclosure there is provided according to a still further aspect an apparatus, comprising:

at least one processor; and
at least one memory including computer program code;
the at least one memory and the computer program code configured to, with the at least one processor, cause the apparatus at least to perform:
  receiving a signal indicating a wireless communication network is supporting an irregular channel bandwidth, said irregular channel bandwidth covering two partially overlapping regular channel bandwidths each having a predefined bandwidth;
  receiving a wireless communication signal in said irregular channel bandwidth;
  routing said wireless communication signal to first and second means for frequency translating said wireless communication signal and for filtering said frequency translated wireless communication signals to generate a first and second frequency translated and filtered signals;
  setting a respective centre frequency used by a respective one of said first and second means for frequency translating, such that said centre frequencies of said first and second means for frequency translating are offset with respect to each other.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Figure 2:
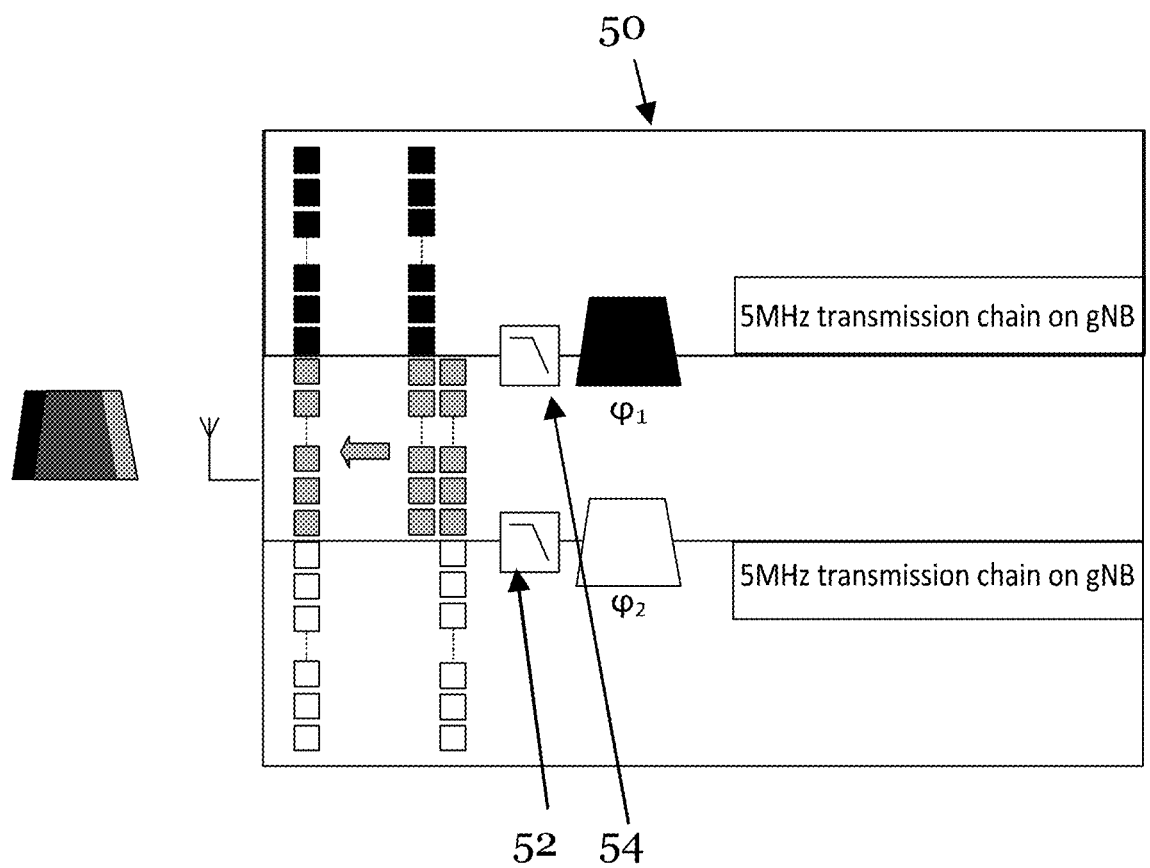
Figure 3:
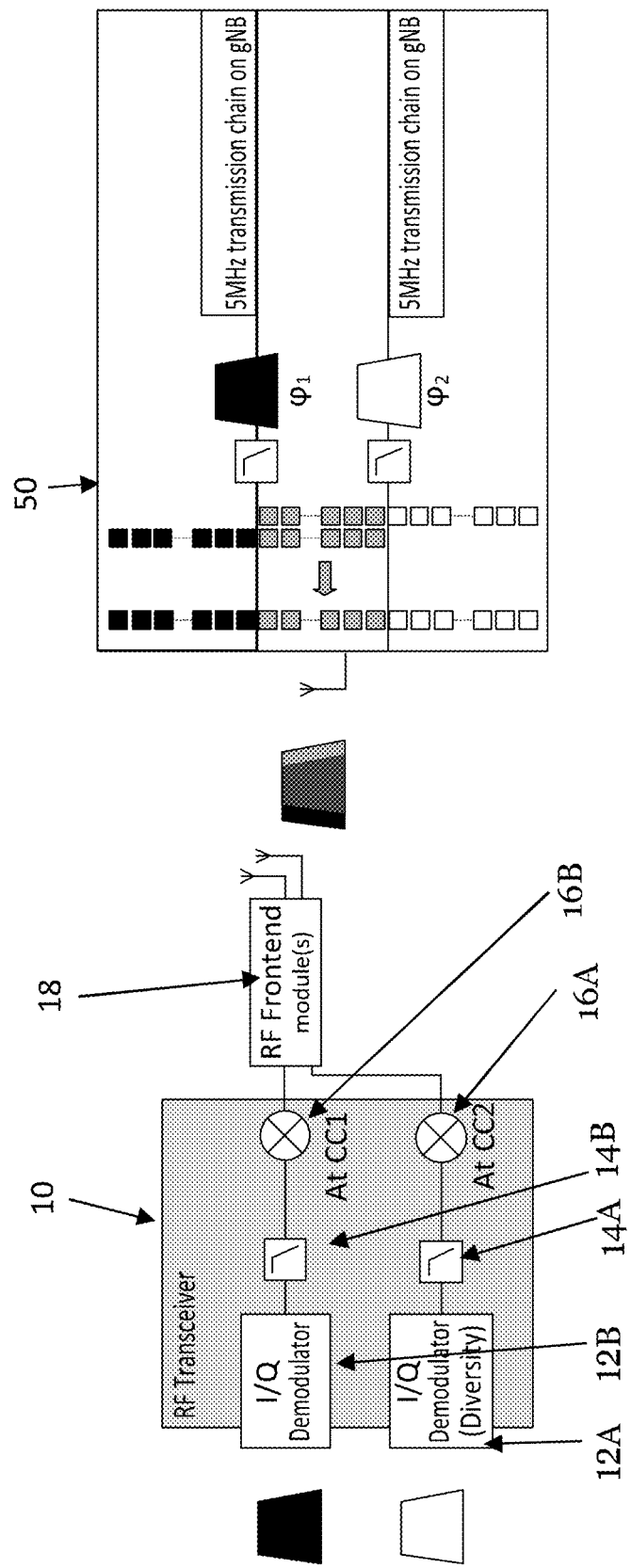
Figure 4:
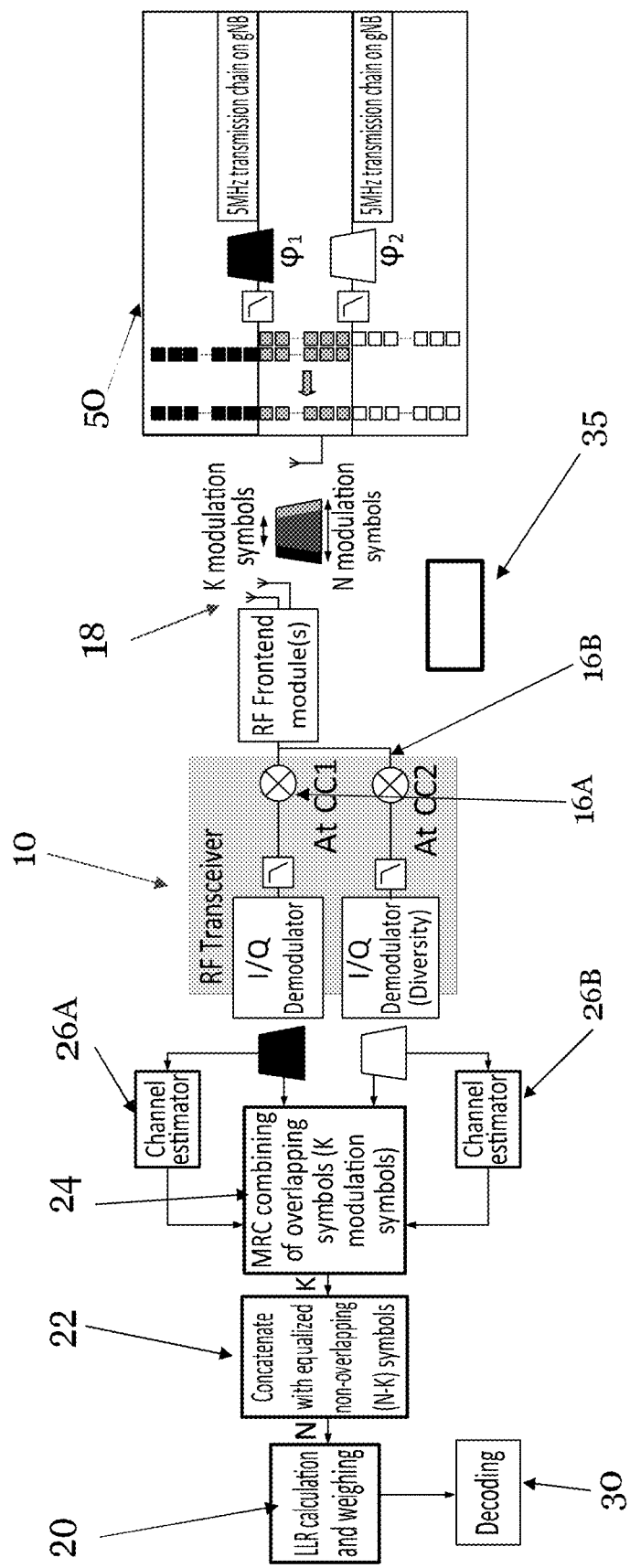
Figure 5:
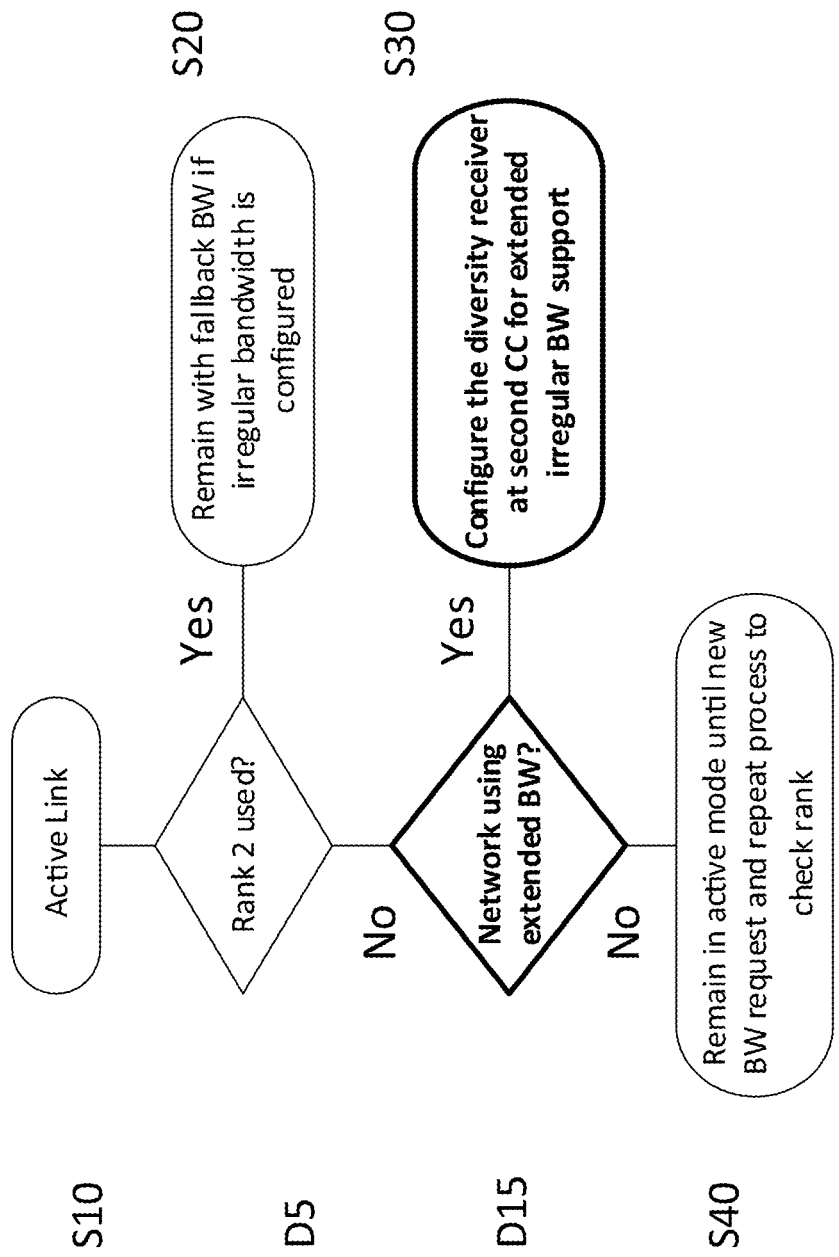
Figure 6:
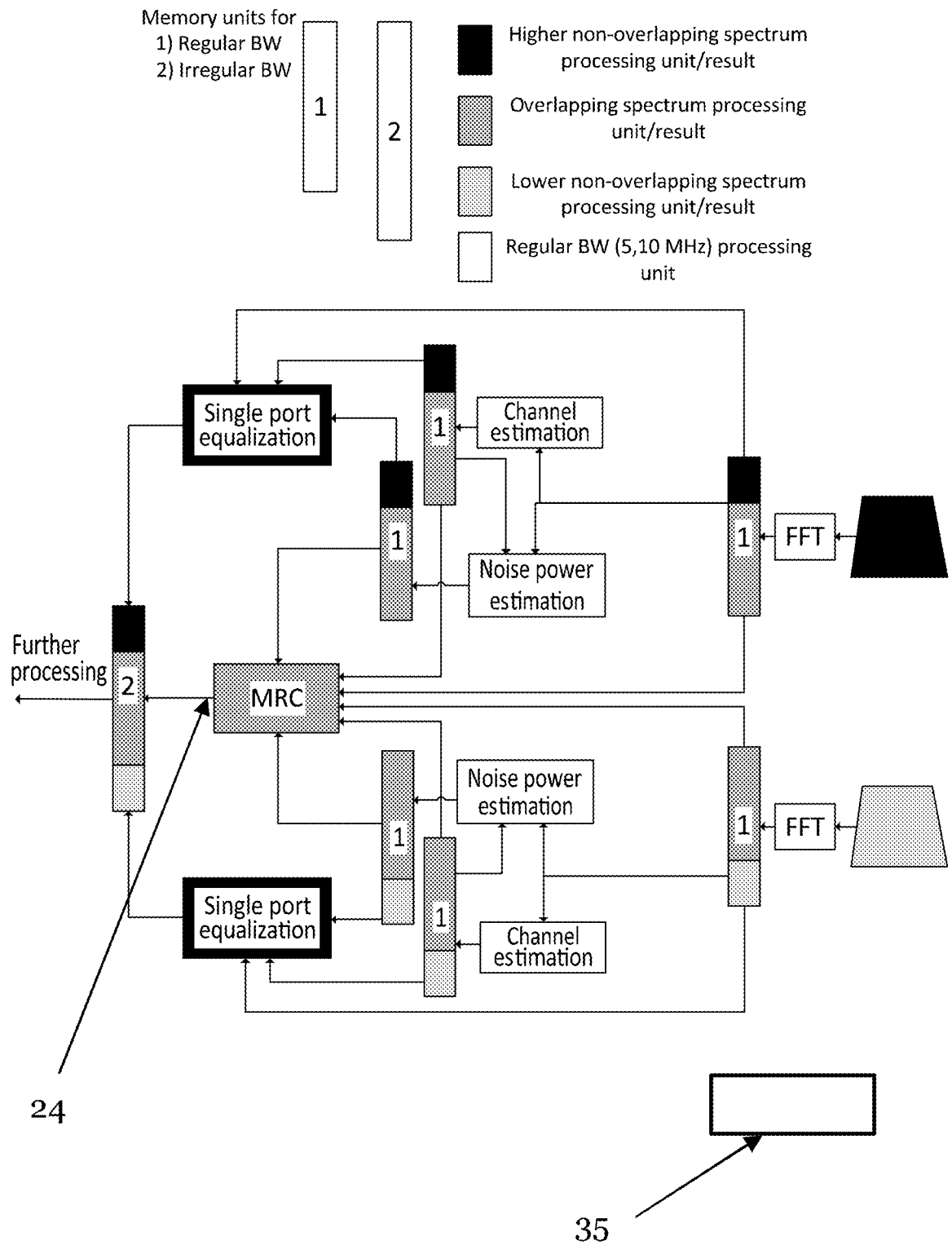
Figure 7:
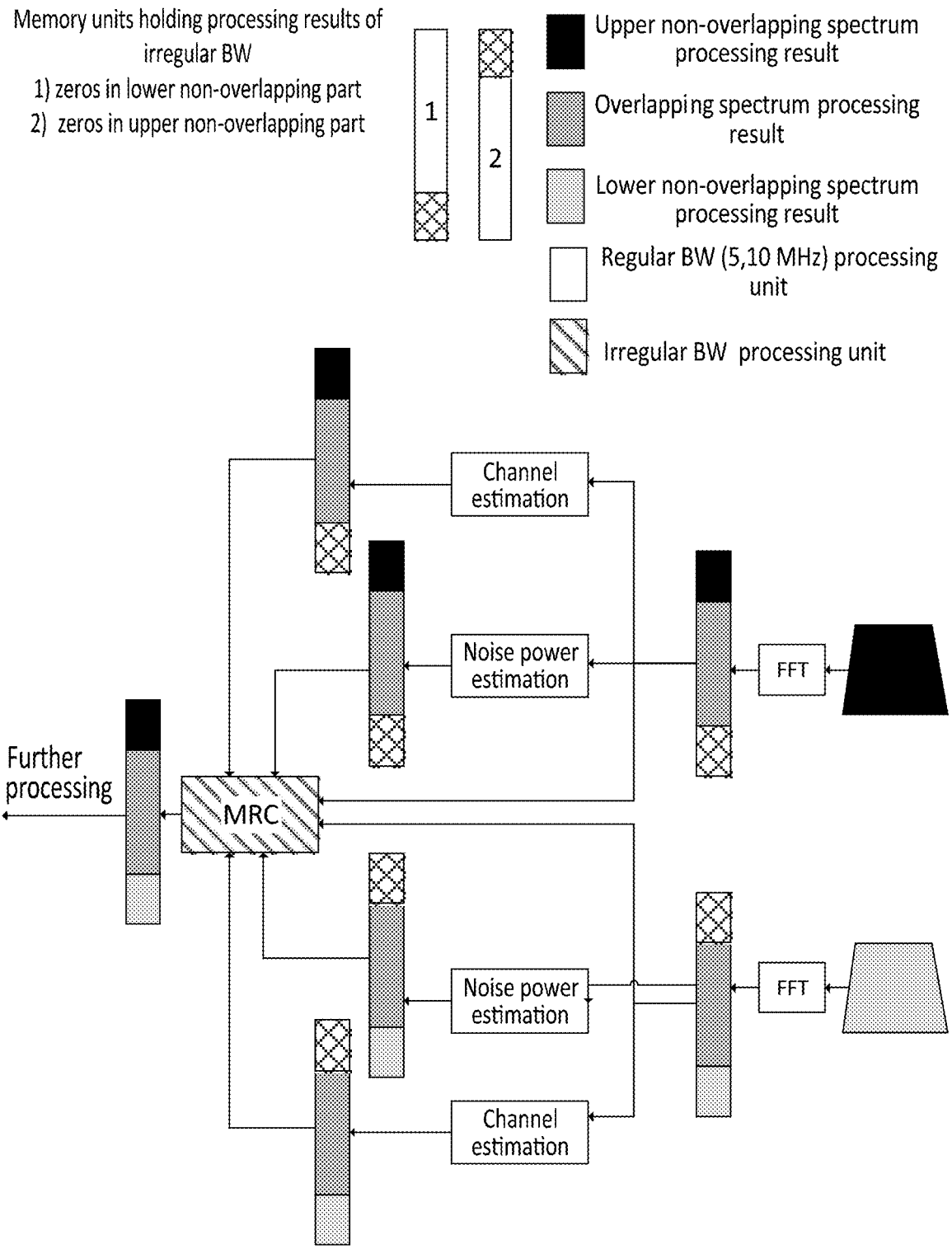
Figure 8:
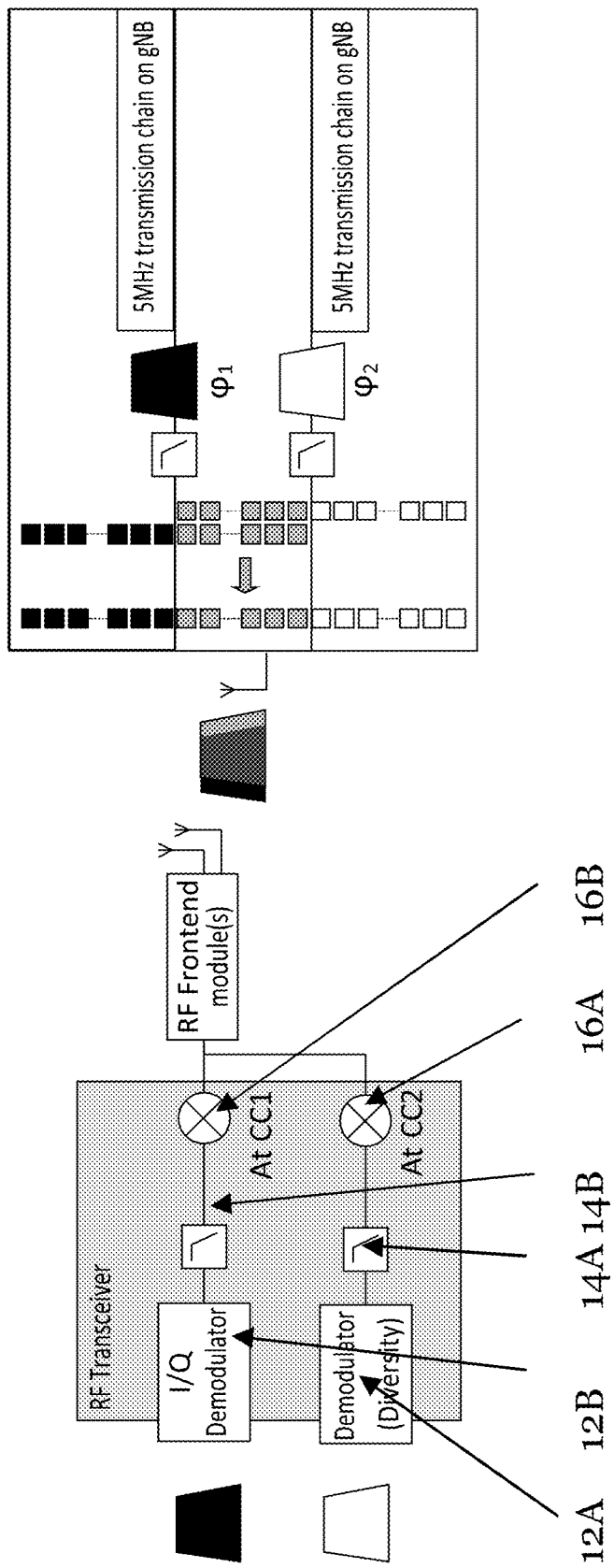
Figure 9:
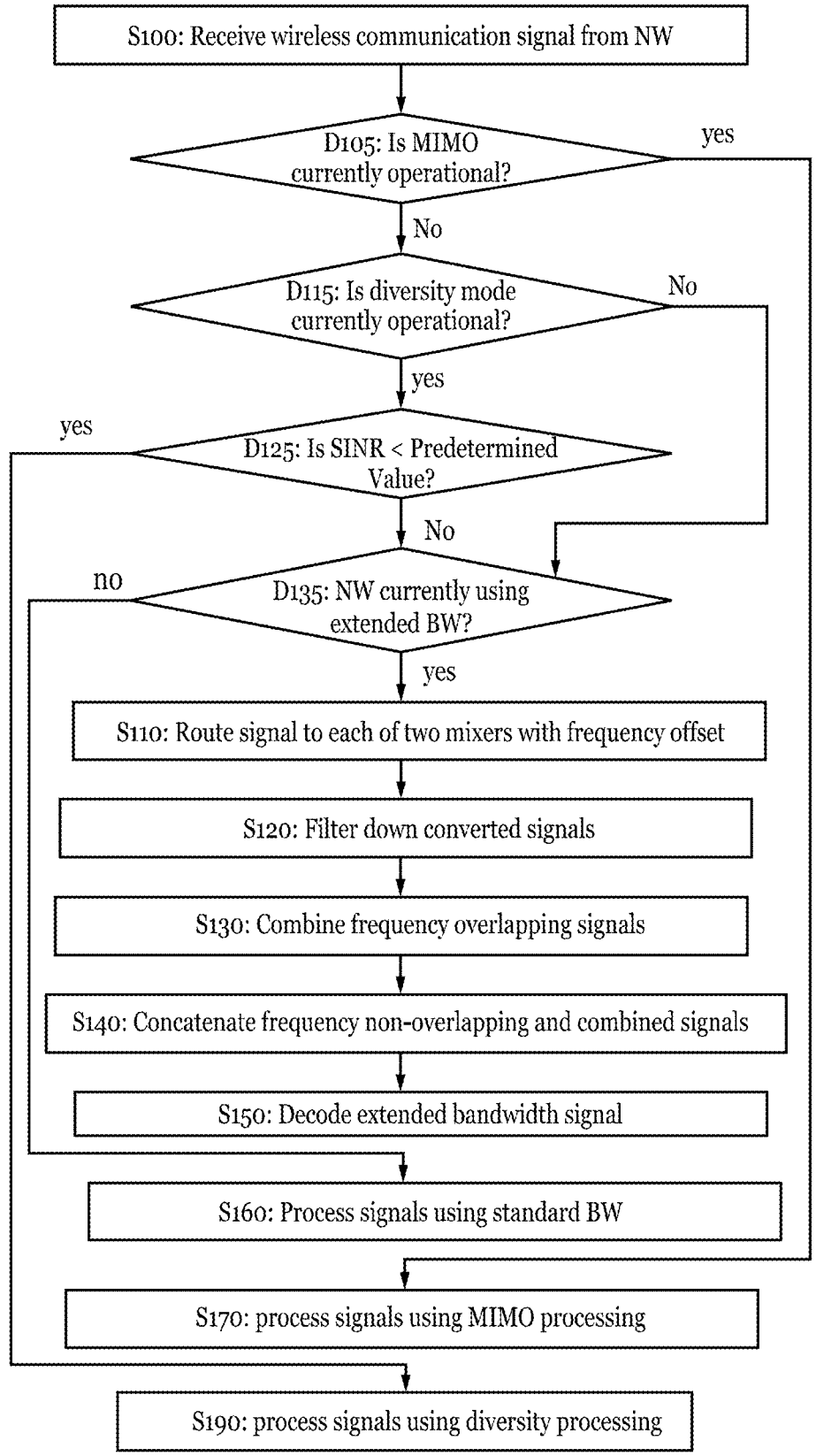

Some example embodiments will now be described with reference to the accompanying drawings in which:

FIG. 1 illustrates how the irregular BW channels are generated at NW to be received at the UE;

FIG. 2 schematically illustrates how a gNB may generate overlapping channel bandwidths CBW;

FIG. 3 schematically illustrates aspects of radio configuration using the diversity receiver to accommodate the overlapping CB according to an example embodiment of the subject matter described herein;

FIG. 4 schematically illustrates signal processing units on the main and repurposed receiver paths according to an example embodiment of the subject matter described herein;

FIG. 5 schematically illustrates a flow diagram illustrating steps in a process for receiver repurposing according to an example embodiment of the subject matter described herein;

FIG. 6 schematically illustrates an example design for combining/equalization and concatenation of different parts of irregular BW in Baseband hardware according to an example embodiment of the subject matter described herein;

FIG. 7 schematically illustrates an alternative design for combining and concatenation of different parts of irregular BW in Baseband hardware according to an example embodiment of the subject matter described herein;

FIG. 8 schematically illustrates a further embodiment with hardware modification between part of the RF front end and the transceiver chip according to an example embodiment of the subject matter described herein; and FIG. 9 schematically illustrates a flow diagram illustrating steps in a process for receiver repurposing according to an example embodiment of the subject matter described herein.

DETAILED DESCRIPTION

Before discussing the example embodiments in any more detail, first an overview will be provided.

It would be desirable to be able to efficiently use the spectrum of the licensed band at a user equipment.

In order to efficiently use the spectrum of the licensed band, embodiments provide a way of supporting irregular bandwidth configurations at the user equipment. Networks are seeking to use new channel bandwidths in some cases bandwidths with higher granularity (compared to a conventional minimum 5 MHZ bandwidth in NR). User equipment have one or more channel filters each configured with a bandwidth corresponding to the bandwidth of one of the channels that the network supports. Where irregular bandwidths that do not correspond to the bandwidth of the channel filters are used, then receiving the signals with perhaps overlapping spectrum becomes problematic.

Some example embodiments address this by configuring the user equipment to use their extra antenna paths, be they diversity or MIMO antenna paths and applying a frequency offset during the frequency down conversion process on these multiple paths. In this way the irregular bandwidth signal is differently frequency shifted on each path and each path then filters a regular bandwidth portion of the frequency shifted irregular bandwidth and the signals from the two paths are then recombined to form a signal with the irregular bandwidth. Some example embodiments make minor hardware adjustments to provide an additional signal path from a single antenna, the original and additional signal path each having frequency translating means for translating and filtering the signals, the two frequency translating means having a centre frequency offset with respect to each other.

FIG. 1 schematically shows how an irregular bandwidth may be formed at a base station 50. The irregular bandwidth may be considered to be formed of two overlapping legacy carrier bandwidths 42 and 44. The network node 50 transmits this irregular channel bandwidth across the air interface to the UE 10. The UE 10 comprises a frequency down conversion mixer 16 that down converts the received signal to a lower frequency bandwidth in some cases to baseband. There is also a channel filter 14 that is configured to filter the channel at a conventional new radio channel bandwidth such as 5 MHZ. The signal is then demodulated by demodulator 12.

FIG. 2 shows how at a network node 50 a new irregular bandwidth may be supported using two existing channelisation filters 52, 54 by aligning these filters to pass overlapping frequency bandwidths such that the combined channel width is larger than each of the channel widths but not an integer amount larger. A problem that arises is that there are overlapping physical resource blocks in the overlapping portions of the spectrum as shown in FIG. 2.

FIG. 3 shows an embodiment of a user equipment 10 that is configured to use one of the extra antenna paths that is present in the UE 10 either for diversity or MIMO purposes. In this way, the hardware that is already present in the UE may be differently configured to support an irregular bandwidth. The received signal is sent along the two different antenna paths each comprising a respective mixer 16A, 16B. The two mixers 16A, 16B each have a local oscillator with a different reference frequency, the two component carriers have a frequency offset with respect to each other. In this way, the down conversion at each mixer may happen at the centre of each of the respective two frequency overlapping channels and a down converted signal with a different centre frequency is generated at each one. Thus each signal has a frequency offset with respect to the other. These two offset down converted channels will then be filtered with channelisation filters 14A, 14B and the adjacent channel interference will be suppressed in usual way.

Following the frequency translation and filtering two frequency overlapping channel signals are generated and they are processed in a way that allows the frequency overlapping portions to be combined and then concatenated with non-overlapping portions to form a frequency down converted signal with an irregular channel bandwidth.

During operation a standard rank 1 receiver path may utilise diversity to add a second receiver path, which ideally is uncorrelated to the first path and provides an additional antenna path for receiving the same signal in a diversity reception mode of operation which increases the combined power of the signal and is beneficial during mobility scenarios allowing a second signal path that explores diversity to avoid deep fades on signal antenna systems. This additional diversity path may be repurposed in embodiments to allow irregular channel bandwidth support without changing the hardware on an antenna. Where user equipment have more than one antenna and more than one antenna path then the antenna path may be repurposed in embodiments to support irregular bandwidth and control circuitry may be configured to control the use that the antenna path is put to. Thus, where the signal to noise ratio is low the additional path may be used for diversity purposes, or where the DCI (downlink control information) indicates that MIMO is being used then it may be used to support MIMO, however, if neither of those two is required then control circuitry may configure on determining that the network is currently supporting irregular bandwidth to allow the UE to also support this irregular bandwidth.

One way of combining the overlapping channels using the two antenna path to support the irregular bandwidth is shown in FIG. 4. The irregular bandwidth signal is down converted by mixers 16A and 16B that have different centre frequencies and the two down converted signals are each output on a channel. Each of the channels has its own channel estimator 26a or 26b and the signals are fed from each of the filtered channels into a maximum ratio combiner MRC 24. The MRC 24 receives signals from each of the channel estimators and accepts the overlapping sub-carriers after taking into account the difference in the two component carriers. After that, the signal is concatenated with equalised non-overlapping symbols at component 22 before a log likelihood ratio weighing calculation is applied at component 20. The signal is then sent to decoder 30. The log likelihood ratio weighing is expected to provide performance improvement of the frequency overlapping portions of the channel since the overlapping sub carriers have been received at different antenna and therefore have diversity properties and are thus expected to have better signal to noise ratio.

The local oscillators LO's within mixers 16A and 16B are programmed/controlled independently by control circuitry 35 and it is required that the UE supports secondary LO assignment on secondary or MIMO receiver paths.

$$CC1 = A\_CC1(t) \cdot \cos(\omega_{CC1} t + \varphi_1(t))$$

$$CC2 = A\_CC2(t) \cdot \cos(\omega_{CC2} \cdot t + \varphi_2(t))$$

Where CC1 is the component carrier of local oscillator 1 and CC2 is the component carrier of local oscillator 2, A is the amplitude, $\omega_{CC1}$ and $\omega_{CC2}$ are the respective frequencies of the component carriers and $\varphi_1$ and $\varphi_2$ denote the random phase offset of the two signals that are not coherent.

After down-conversion using different LO frequencies $$LO_{CC1} = A_{LO} \cdot \cos(\omega_{CC1} \cdot t)$$

$$LO_{CC2} = A_{LO} \cdot \cos(\omega_{CC2} \cdot t)$$

and filtering through a filter, the two signals at baseband have the same bandwidth, if $\omega CC1 +$ (irregular BW−next smaller BW)$= \omega CC2$. Hence, the UE must adapt $LO_{CC2}$ according to additional excess bandwidth based on network information indicating channel reconfiguration to the irregular BW. For example, if the irregular BW is 7 MHz and the next smaller BW is 5 MHz, the $\omega CC2$ will be equal to $\omega CC1 + 2$ MHz, where $\omega CC1$ is positioned at 2.5 MHz from the lower edge of the irregular channel bandwidth.

In one embodiment, the control circuitry 35 may include conditional checks of the diversity usage and based on current UE channel and received input signal strength the UE may decide whether or not to respond to irregular bandwidth reconfiguration. In some cases such as low signal level or radio propagation experiencing a lot of fading the control circuitry 35 may respond to the network indicating that its capability to support the irregular bandwidth is not present. The UE reports this as in such cases the second antenna may be required for diversity reception to secure the radio link against radio link failure, and may configure the local oscillators of the mixers accordingly.

Such a method is different to the diversity and MIMO receivers since the diversity processes completely overlapping frequency channels and increases the received power while MIMO re-utilises the entire bandwidth spectrum having coding orthogonality to separate the data content. In this embodiment there is a mixture of the methods and the down conversion and demodulation of the non-overlapping parts of the spectrum is different to both diversity and MIMO reception while the overlapping parts of the spectrum are treated as the diversity processing with the different parts of the irregular channel bandwidth then being concatenated.

In summary, embodiments provide a novel user equipment receiver which in some embodiments re-purposes the diversity and/or MIMO path to allow for correct reception of a signal with an irregular bandwidth. To do this it provides each receive path with a mixer that has a different centre frequency that allows reception of the irregular bandwidth using RF and base band components (e.g. filters ADC, analogue to digital converters) tailored to operate at the next smaller channel bandwidth.

The particular centre frequencies of the mixers (CC1 and CC2 component carriers 1 and component carriers 2) are designed to demodulate the whole irregular channel bandwidth.

There may then be further adaptation of the base band architecture and algorithms to exploit the partial spatial diversity offered by the overlapping irregular bandwidth signal. The overlapping sub-carriers shown in FIG. 4 for example are found in both the receiver paths and are affected by independent channel responses. By using a suitable MRC 24 these overlapping signals can be used to improve the link performance (spatial diversity) through proper combining in this base band processing.

The description of FIG. 4 given above described how a user equipment 10 may be configured to process an irregular channel bandwidth using the hardware currently present in the user equipment adapted to perform in this way. The control circuitry 35 within the user equipment 10 is operable to control the operation of the user equipment 10 and in particular, to control whether the antenna paths operate as diversity or MIMO antenna paths or whether they operate to receive and process an irregular channel bandwidth as described above. Thus, control circuitry 35 may be configured to determine whether rank 2 MIMO is currently being used which it may determine through an apposite field in the scheduling DCI (downlink control information) and in which case circuitry 35 controls the user equipment to operate under normal standardised bandwidth configuration. If however the control circuitry 35 determines that the UE is not operating under MIMO conditions and the second antenna is not being used for this, the control circuitry may reconfigure the antenna path to support irregular bandwidth by adjusting the local oscillator frequencies at the respective mixers 16a and 16b so that they have an offset.

FIG. 5 shows a flow diagram illustrating steps in a method performed by a user equipment according to an embodiment. At step S10 an active link is generated between the network and the UE. At step D5 the UE checks whether rank 2 MIMO is used through the apposite field in the scheduling DCI. If it is then at step S20 the UE falls back to standard bandwidth support even if an irregular/extended bandwidth is configured. If rank 2 MIMO is not used then at step D15 the UE determines whether the network is using extended bandwidth. If it is then the UE configures the diversity/MIMO receiver at a second component carrier for extended irregular bandwidth support S30 while if the network is not using extended bandwidth then at step S40 the UE remains in active mode until a new bandwidth request whereupon it repeats the process starting at step S20 to check the rank being used.

FIG. 6 provides an alternative example design for the novel baseband processing, which occurs after the signals are down-converted at CC1 and CC2, characterized by selective combining and equalization followed by symbols concatenation. In FIG. 6 the darkest coloured boxes depict the higher frequency non-overlapping spectrum processing units or results. The second darkest depict the overlapping spectrum processing unit/result. While the third darkest boxes depict the lower non-overlapping spectrum processing unit/result, and the clear boxes depict regular bandwidth processing units.

Step 1: The processor performs FFT, channel estimation and noise estimation on each of the down-converted blocks, which are done similarly to existing processing for regular BW.

Step 2: The output of step 1 (FFT output, channel estimate and noise estimate) is fed into a novel MRC combining block 24 which is configured to do the combining operation for the overlapping part of the irregular bandwidth. Concurrently, the single port equalization blocks are configured to do equalization of lower and upper non-overlapping parts of the irregular BW, since combining for those frequency bins is not possible.

Step 3: The outputs from MRC and single port equalization blocks are then written to memory 2 in the order in which the part of BW they process appears in the irregular BW. The processing blocks shown in FIG. 6 may exist in UE implementations today and can be configured as shown from software update and controlled by control circuitry 35 to operate in one of irregular bandwidth mode, MIMO mode or diversity mode.

An issue with the above design may be the number of blocks requiring access to the different memories. One way to handle this, would be to ensure the runtime for each read sample from the memories are fast enough to enable all required access to be done inside the processing time of one sample.

An alternative design is as shown in FIG. 7, this design does not require single port equalisation means for processing the non-overlapping portion of the spectrum. In this design the memory units are for holding data/results for irregular BW. The memory units are set to hold zeros before the processing begins. The FFT, channel estimation and noise power estimation units operate over regular BW and output their results to zero initialized memory units such that part of irregular BW which is not covered by them remains the same. The MRC combining can then be run over the entire irregular BW and its output can then be used for LLR computation and further processing. This embodiment can also be configured using existing processing blocks from software.

The steps for processing the data would comprise the following:
1. Store FFT output in FFT dedicated memory.
2. Use FFT dedicated memory content to run Channel Estimation (CE) followed by Noise Power Estimation (NPE) and store result in dedicated CE and NPE memories.
3. Run MRC equalization using results from FFT, CE and NPE. In this case the memories are initialized in a way, which enables MRC to be run on the full bandwidth data. This eliminates the need for concatenation and provides a way to directly output the result from the MRC.
4. Store result correctly in resulting memory storage.

In this design the issue with multiple access to the same memory blocks are reduced as the data will go directly to the MRC block.

FIG. 8 shows a further embodiment that is appropriate for a single antenna. This requires a hardware change which allows for splitting the received signal from the single antenna towards two receive chains for similar frequency offset down-conversion as described with respect to FIGS. 3 and 4. Such addition in the front end either at the front-end antenna switches, or past the LNA (low noise amplifier) modules will introduce more hardware and control logic and give a slight degradation of the NF (noise figure) of the receiver, but will allow the method to support reception of the irregular bandwidth through one receiver antenna.

FIG. 9 shows a flow diagram illustrating steps in a method according to an embodiment. The method is performed at a user equipment according to an embodiment and in the initial step S100 a wireless communication signal is received from the network. The user equipment determines at step D105 whether MIMO is currently operational. If it is then it proceeds to step S170 and processes the signals received from the antennas using MIMO processing. If it is not then it determines at step D115 if the diversity mode is currently operational. If it is then then it determines at step D125 if the signal to noise ratio is less than a predetermined value. If the signal to noise ratio is less than a threshold value, which may be predetermined, then this indicates to the user equipment that the diversity mode is important to receive signals correctly and it proceeds to step S190 to process the signals received at the two antennas and sent via the two radio frequency receiver chains using diversity processing.

If the signal to noise ratio is not below the threshold value or if at step D115 it is determined that diversity mode is not currently required then the user equipment proceeds to step D135 where it determines whether or not the network is currently using extended, that is irregular, bandwidth. If it is currently supporting and using the extended bandwidth then it routes the signal received to each of two mixers that are configured to have a centre frequency offset at step S110. At step S120 the down converted signals are each filtered using two bandwidth filters that are configured for each of two overlapping channels. Then at step S130 the overlapping frequency portions of the two signals are combined in a MRC and the non-overlapping portions of the signal and the combined signal output by the MRC are then concatenated at step S140. The combined and concatenated signals are then sent to a decoder where they are decoded as an extended bandwidth signal at step S150.

If, however at Step D135 it was determined that the network is not currently assigning extended bandwidth to the UE, then the signals are processed using the standard bandwidth processing at step S160.

In summary these implementations support irregular bandwidth in 3GPP reusing existing hardware and modifying the software to the system, or by very minor hardware changes such as additional local oscillator paths or additional switches. In these embodiments the UEs may support a broader downlink channel than what is referred to as the Next Smaller Bandwidth and allowing this will increase downlink throughput compared to UEs without the adaptation. Similarly UEs that supports the irregular bandwidth through Next Wider Bandwidth will suffer from experiencing lower ACS (adjacent channel selectivity) which is not an issue associate with embodiments.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   at least one processor; and
   at least one memory including computer program code which, when executed by the at least one processor, causes the apparatus at least to perform the following:
   a first frequency translating of a wireless communication signal in a frequency bandwidth that is different to a predefined bandwidth and filtering of said frequency translated wireless communication signal;
   a second frequency translating of the wireless communication signal in a frequency bandwidth that is different to a predefined bandwidth and filtering of said frequency translated wireless communication signal;
   a first adjusting of a centre frequency used for said first frequency translating;
   a second adjusting of a centre frequency used for said second frequency translating; and
   controlling, responsive to receipt of a signal indicating a wireless communication network is supporting an irregular channel bandwidth, said irregular channel bandwidth covering two partially frequency overlapping regular channel bandwidths each one of the regular channel bandwidths having said predefined bandwidth, by routing a received wireless communication signal for said first frequency translating and said second frequency translating and controlling said first adjusting to set said centre frequency of said first frequency translating and controlling said second adjusting to set said centre frequency of said second frequency translating such that said respective centre frequencies of said first frequency translating and said second frequency translating are offset with respect to each other.

2. An apparatus according to claim 1, further configured to:
   combine a plurality of signals;
   concatenate a plurality of signals to form an irregular bandwidth signal; and
   route frequency overlapping portions of said translated and filtered signals for said combining; and
   route frequency non-overlapping portions of said filtered signals and signals output from said combining for concatenating.

3. An apparatus according to claim 1, configured to pass signals within a predefined bandwidth and attenuate signals outside of said predefined bandwidth, a respective centre frequency of said predefined bandwidth being set by a respective one of said first and second adjusting, said apparatus further configured to:
   extend a signal output by each of said first frequency translating and second frequency translating to extend said predefined bandwidth to a bandwidth size of said irregular bandwidth by applying zeros to one side of said predefined bandwidth, said one side corresponding to a portion of said signal of said irregular bandwidth not filtered; and
   combine said extended signals to form an irregular bandwidth signal.

4. An apparatus according to claim 2, configured to decode said irregular bandwidth signal.

5. An apparatus according to claim 1, further comprising a first and a second antenna, wherein said controlling routes a signal from said first antenna to said first frequency translating and a signal from a second antenna to said second frequency translating.

6. An apparatus according to claim 5, wherein said controlling is responsive to receipt of said signal indicating a wireless communication network is supporting an irregular channel bandwidth to determine whether said first and said second antennas are being used to receive a signal in a diversity mode, and if so, to determine a signal strength of said received signal.

7. An apparatus according to claim 6, wherein said controlling is responsive to determining that said signal strength is below a predetermined value to continue with said diversity mode and to determining that said signal strength is not below the predetermined value, to route said received wireless communication signal from said first antenna to said first frequency translating and from said second antenna to said second frequency translating and to control said first adjusting and said second adjusting to set a respective centre frequency of said first frequency translating and said second frequency translating such that said centre frequency of each of said first frequency translating and said second frequency translating are offset with respect to each other.

8. An apparatus according to claim 1, wherein said controlling is responsive to receipt of said signal indicating a wireless communication network is supporting an irregular channel bandwidth, to determine whether multiple input multiple output mode is operational and if not to route said received wireless communication to each of said first frequency translating and said second frequency translating and to control said first adjusting and said second adjusting to set a respective centre frequency of said first frequency translating and said second frequency translating such that said respective centre frequencies of each of said first frequency translating and said second frequency translating are offset with respect to each other.

9. A method, comprising:
   receiving a signal indicating a wireless communication network is supporting an irregular channel bandwidth, said irregular channel bandwidth covering two partially overlapping regular channel bandwidths each having a predefined bandwidth;
   receiving a wireless communication signal in said irregular channel bandwidth;
   routing said wireless communication signal to first frequency translating and second frequency translating said wireless communication signal and for filtering said frequency translated wireless communication signals to generate first and second frequency translated and filtered signals;

setting a respective centre frequency used by a respective one of said first frequency translating and said second frequency translating, such that said centre frequencies of said first frequency translating and said second frequency translating are offset with respect to each other.

10. A method according to claim 9, further comprising:
combining overlapping portions of said translated and filtered signals;
concatenating non-overlapping portions of said translated and filtered signals and said combined overlapping portions to form an irregular bandwidth signal.

11. A method according to claim 9, wherein said generating of said first and second frequency translated and filtered signals for frequency translating said wireless communication signal comprises passing signals within a predefined bandwidth and attenuating signals outside of said predefined bandwidth, respective centre frequencies of said predefined bandwidths for each of said first and second frequency translated and filtered signals being offset with respect to each other: said method further comprising:
extending each of said first and second frequency translated and filtered signals to extend said predefined bandwidth to a bandwidth size of said irregular bandwidth by applying zeros to one side of said predefined bandwidth, said one side corresponding to a portion of said signal of said irregular bandwidth not filtered; and
combining said extended first and second frequency translated and filtered signals to form an irregular bandwidth signal.

12. A method according to claim 10, said method further comprising decoding said irregular bandwidth signal.

13. A method according to claim 9, comprising receiving said wireless communication signal in said irregular channel bandwidth at a first antenna and a second antenna; and
said routing of said wireless communication signal comprising routing said wireless communication from each of said first antenna and said second antenna to a respective one of said first frequency translating and said second frequency translating.

14. A method according to claim 13, comprising:
in response to receipt of said signal indicating a wireless communication network is supporting an irregular channel bandwidth, determining whether said first antenna and said second antenna are being used to receive a signal in a diversity mode, and if so, determining a signal strength of said received signal and where said signal strength is below a predetermined value continuing with said diversity mode, and where not,
performing said setting of said respective centre frequency used by said respective one of said first frequency translating and said second frequency translating, such that said centre frequencies of said first frequency translating and said second frequency translating are offset with respect to each other.

15. A method according to claim 9, comprising:
in response to receipt of said signal indicating a wireless communication network is supporting an irregular channel bandwidth determining whether multiple input multiple output mode is currently operational and if not performing said setting of said respective centre frequency used by said respective first frequency translating and said second frequency translating, such that said centre frequencies of said first frequency translating and said second frequency translating are offset with respect to each other.

16. A non-transitory computer-readable storage medium storing a computer program which when executed by a processor on a user equipment is operable to cause said user equipment to perform the following:
receiving a signal indicating a wireless communication network is supporting an irregular channel bandwidth, said irregular channel bandwidth covering two partially overlapping regular channel bandwidths each having a predefined bandwidth;
receiving a wireless communication signal in said irregular channel bandwidth;
routing said wireless communication signal to first frequency translating and second frequency translating said wireless communication signal and for filtering said frequency translated wireless communication signals to generate first and second frequency translated and filtered signals;
setting a respective centre frequency used by a respective one of said first frequency translating and said second frequency translating, such that said centre frequencies of said first frequency translating and said second frequency translating are offset with respect to each other.

* * * * *